United States Patent [19]

Aranyos

[11] 4,372,011
[45] Feb. 8, 1983

[54] FLEXIBLE BAND CLAMP

[76] Inventor: Nereo Aranyos, 1073 Dominion Rd., Auckland, New Zealand

[21] Appl. No.: 228,738

[22] Filed: Jan. 27, 1981

[51] Int. Cl.³ .............................. B65D 63/10
[52] U.S. Cl. ..................... 24/20 TT; 24/16 PB
[58] Field of Search ............ 24/17 AP, 16 PB, 256, 24/20 R, 20 TT, 16 R, 255 SL, 30 SP; 248/74 PB, 74 B

[56] References Cited

U.S. PATENT DOCUMENTS

| | | | |
|---|---|---|---|
| 3,605,200 | 9/1971 | Vallinotto et al. | 24/20 TT |
| 3,925,851 | 12/1975 | Bevans | 24/20 TT |
| 4,128,918 | 12/1978 | Wenk | 24/20 TT |
| 4,183,120 | 1/1980 | Thorne | 24/20 TT |
| 4,306,740 | 12/1981 | Kleykampf et al. | 24/20 TT |

*Primary Examiner*—Paul J. Hirsch

[57] ABSTRACT

The invention relates to a clip for securing together articles, and the clip includes a band which is formed of a suitable material such as plastic and metal. Rib formations are provided at both ends of the band and the rib formations each consist of a plurality of teeth or ribs, a first end of the band being formed with a lower rib formation and a lip formation or portion spaced apart from and above the rib formation, the ribs or teeth of the lower rib formation at the first end of the band extending upwardly and a recess being formed between the upwardly extending ribs or teeth and the upper spaced apart lip portion and upper surface of the upper lip portion at the first end of the clip is provided or formed with a plurality of ribs or teeth. The rib formation at a second end of the band is provided in the form of at least a base end portion, which is formed on its lower face with a plurality of downwardly extending teeth or ribs, at least one spaced apart and overhanging portion being provided above the face end portion and being provided with downwardly extending teeth or ribs on its lower surface. A recess is formed between an upper surface of the base end portion and the teeth or ribs on the lower portion of the upper spaced apart overhanging portion.

4 Claims, 4 Drawing Figures

FLEXIBLE BAND CLAMP

BACKGROUND OF THE INVENTION

This invention relates to securing means.

The present invention more particularly relates to securing means in the form of a clip which is adapted to be fastened about a member or plurality of members to retain one or more members in a desired position or in juxtaposition one with the other. For example, the securing means may be used to be passed about a pipe or for holding a plurality of pipes or for example wires together.

Up until this time, it has been known to provide numerous clips such as that outlined above, such as for example U.S. Pat. No. 3,605,200 (Vallinotto et al) and U.S. Pat. No 3,925,851 (Bevans). These clips have however often been deficient in strength and durability, and the present invention provides a clip which is provided with means to ensure a more effective and stronger engagement and securing action.

BRIEF SUMMARY OF THE INVENTION

It is an object of this invention to provide a securing means which is straight forward and efficient and to provide a modification and improvement over prior securing means.

Other objects of this invention will become apparent from the following description.

According to one aspect of this invention there is provided a clip including a band formed of a suitable material, rib formations being provided at both ends of the band and the rib formations each consisting of a plurality of teeth or ribs; a first end of the band being formed with a lower rib formation and a lip portion being spaced apart from and above said rib formation, the ribs or teeth of the lower rib formation at the first end of the band extending upwardly and a recess being formed between the upwardly extending ribs or teeth and the upper spaced apart lip portion; an upper surface of said upper lip portion being formed or provided with a plurality of ribs or teeth; the rib formation at a second end of the band being in the form of at least a base end portion, being formed on its lower face with a plurality of downwardly extending teeth or ribs; a spaced apart and overhanging portion being provided above the base end portion and being provided with downwardly extending teeth or ribs on its lower surface; a recess being formed between an upper surface of the base end portion and the teeth or ribs on the lower portion of the upper spaced apart overhanging portion; the arrangement being such that the ends of the band are brought together and the base end portion and downwardly extending teeth or ribs thereof are received and located within the recess formed between the upwardly extending teeth or ribs of the lower portion of the first end of the band and the upper lip portion at the first end of the band; the said upper lip portion in the first end of the band passing into a recess formed between the base end portion of the second end of the band; the teeth in the upper lip portion at the first end of the band and the teeth in the upper overhanging portion at the second end of the band engaging one with the other so that the ends of the clip are engaged one with the other.

DETAILED DESCRIPTION OF THE INVENTION

Figure 1:
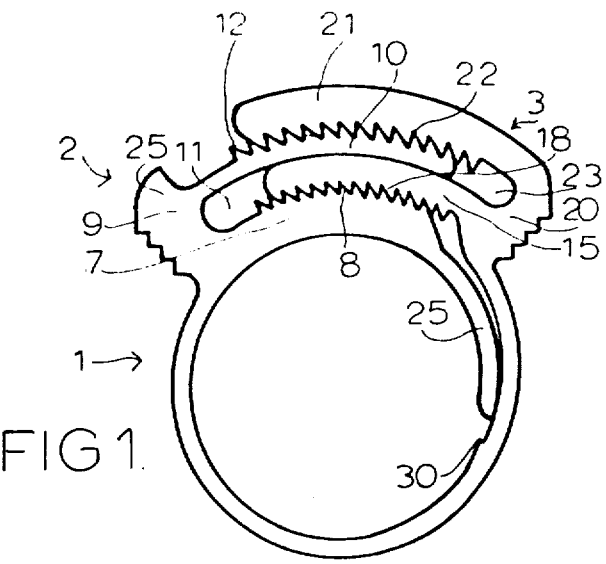
FIG. 1 is a front view of the said invention.
Figure 2:
FIG. 2 is a side view of the said invention.
Figure 3:
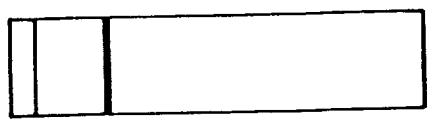
FIG. 3 is a bottom view of the said invention.

In a preferred form of the invention, the clip 1 is constructed of a suitable resilient material such as a plastics material. This is not however essential and the clip can be constructed of any suitable material, for example metal.

The clip consists of an elongate band 1 which has rib formations generally indicated by numerals 2 and 3. The rib formation 2 is provided at a first end of the band and the rib formation 3 at a second end of the band.

As will be appreciated, the major portion of the band is substantially arcuate or flexible in formation so as to be able to pass about a pipe, tube or alternatively a plurality thereof or for example a wire or plurality of wires. This is by way of example only.

The rib formation 2 at the first end of the band is provided with a lower end portion 7 which tapers into an elongate finger or tongue portion 25 which in use is adapted to wrap around the inner surface of the band and this will be appreciated from later description, with reference to the drawings. A plurality of teeth or ribs 8 are provided extending upwardly from the upper surface of the lower end portion 7 and the lower end portion 7 also extends or is formed into an upwardly extending end portion 10 which is spaced apart from and above the lower end portion 7, so as to form a recess therebetween. The recess is indicated by numeral 11. In this form of the invention the upper surfaces of the upper end portion 10 is formed or provided with a plurality of teeth or ribs 12.

The second end 3 of the band is formed with a base end portion 15 which has on its lower face a plurality of teeth 18. The second end of the band forms into an end portion 20 which leads into an outwardly extending upper overhanging portion 21, which is spaced apart from and above the lower end portion 18 and which is provided with a plurality of teeth 22 on its lower surface. A recess 23 is provided between the lower end portion 18 and the upper overhanging portion 21.

Figure 4:
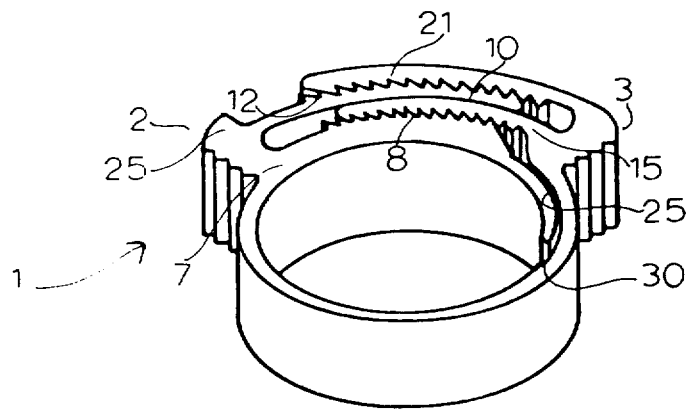
FIG. 4 is a perspective view of the said invention.

Referring now to FIG. 4 of the accompanying drawings, the cip is shown with the ends 2 and 3 engaged.

It will be appreciated that in use the ends 2 and 3 of the clip are brought together and the base end portion 15 at the second end 3 of the base 1 passes into the recess 11 between the lower portion 7 and the upper portion 10 at the first end 2 of the band 1. The teeth 8 of the lower portion 7 and the teeth 18 of the lower portion 15 engage one with the other. The tongue portion 25 wraps around the inner surface of the band, and can abutt against a step 30 on an inner surface of the band of the clip 1. This can assist in imparting strength to the clip and any connection. In addition, during engagement the upper overhanging portion 10 at the first end 2 will pass into the recess 23 between the lower portion 18 and the overhanging upper portion 21 and the teeth 22 and 12 will engage one with the other so as to provide an additional secure engagement therebetween.

A raised abutment 25 can be provided at each end to limit movement of component parts during connection. This is not, however, essential to the performance of the invention.

The ribs or teeth are preferably substantially saw-toothed although this is by way of example only. They should however be formed to permit meshing and a secure engagement.

The ends can be interengaged by a lateral engagement but preferably the end portions are located one within the other by means of hand pressure or a suitable implement. For the release of the ends of the clip, a slight lateral pressure is applied to both ends of the clip, in opposite directions, this enabling immediate release of the ends from one another.

The formation of the clip according to this present invention, and as defined hereinbefore with reference to the drawings, will indicate that the clip provides a stronger and more effective securing relationship between the ends of the clip, than did earlier clips such as those disclosed in U.S. Pat. Nos. 3,605,200 (Vallinotto et al) and 3,925,851 (Bevans).

In addition, the elongate finger 25 extending outwardly from the lower portion 7, at the first end 2 of the clip, during engagement and on wrapping around the inside of the band of clip 1, and abutting against an abutment or foot means 30 adds strength and rigidity to the securing means.

It should be appreciated that the invention has been described by way of example only and that modifications and improvements may be made without departing from the scope or spirit thereof.

I claim:

1. A clip including a band formed of a suitable material, rib formations being provided at both ends of the band and the rib formations each comprising a plurality of teeth; a first end of the band being formed with a lower rib and an upper rib being spaced apart from and above said lower rib, the teeth of the lower rib at the first end of the band extending upwardly and a recess being formed between the upwardly extending teeth and the upper spaced apart rib at the first end of said band; an upper surface of said upper rib being formed or provided with a plurality of teeth; the rib formation at a second end of the band being in the form of at least a base end rib, being formed on its lower face with a plurality of downwardly extending teeth; a spaced apart and overhanging rib being provided above the base end rib and being provided with downwardly extending teeth on its lower surface; a recess being formed between the upper surface of the base end rib and the teeth on the lower surface of the upper spaced apart overhanging rib; the arrangement being such that the ends of the band are brought together and the base end rib and downwardly extending teeth thereof of the second end are received and located within the recess formed between the upwardly extending teeth of the lower rib of the first end of the band and the upper rib at the first end of the band; the said upper rib in the first end of the band passing into the recess formed between the base end rib of the second end of the band and the upper overhanging rib of the second end of the band; the teeth in the upper rib at the first end of the band and the teeth in the upper overhanging rib at the second end of the band engaging one with the other so that the ends of the band are engaged one with the other.

2. A clip as claimed in claim 1 and wherein the teeth are substantially saw-toothed in formation.

3. A clip as claimed in claim 1 or claim 2 and wherein the lower rib of the first end of the band extends into an elongate tongue which when the ends of the band are secured together, extends around the inner surface of the band.

4. A clip as claimed in claim 3 and wherein the inner surface of the band is provided with a step or abutment to provide for rest and abutment of the end of the elongate tongue of the lower rib at the first end of said band.

* * * * *